Feb. 5, 1935. C. W. LEGUILLON 1,989,702
METHOD FOR MAKING MULTICOLORED RUBBER ARTICLES
Filed Jan. 5, 1931 2 Sheets-Sheet 2
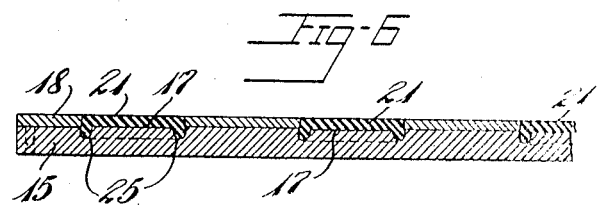
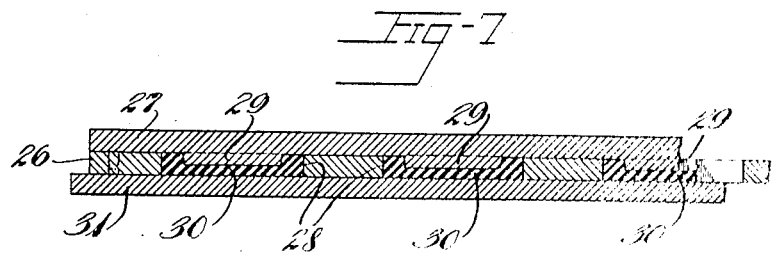
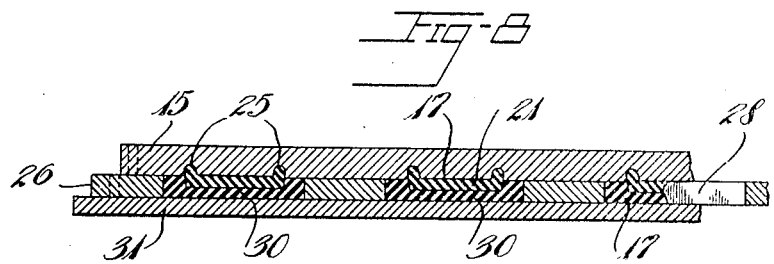
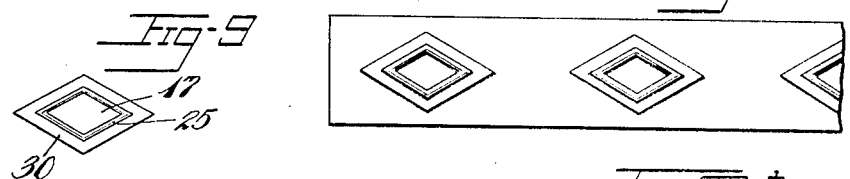
Inventor
Charles W. Leguillon
By Eakin & Avery
Attys.

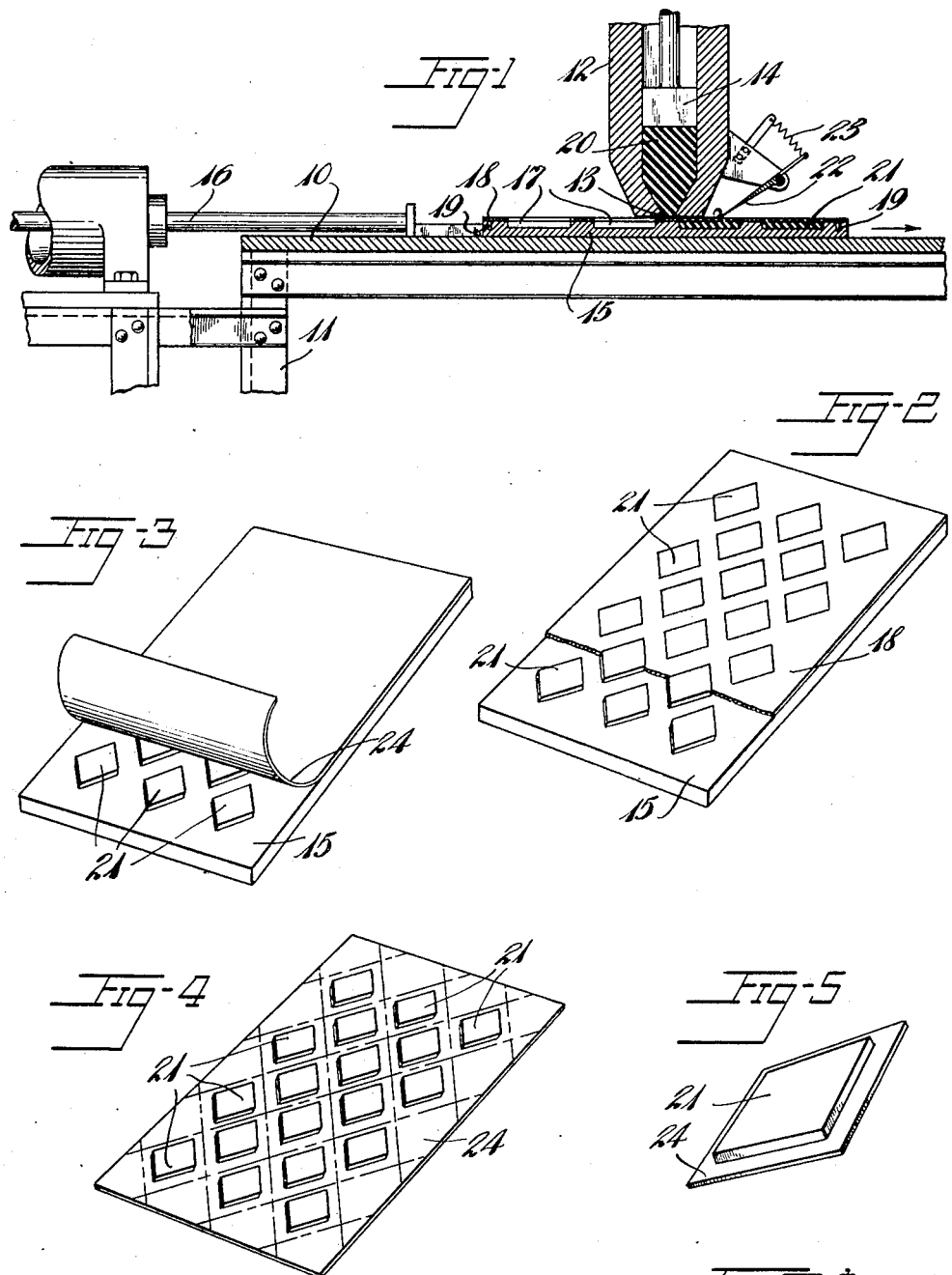

Patented Feb. 5, 1935

1,989,702

UNITED STATES PATENT OFFICE 1,989,702

METHOD FOR MAKING MULTICOLORED RUBBER ARTICLES

Charles W. Leguillon, Akron, Ohio, assignor to The B. F. Goodrich Company, New York, N. Y., a corporation of New York Application January 5, 1931, Serial No. 506,551

11 Claims. (Cl. 18—61)

This invention relates to the manufacture of rubber and particularly to the manufacture of embossed rubber articles such as rubber labels having the lettering composed of a rubber composition of a different color from that in the base.

An object of this invention is accordingly to provide an apparatus by means of which multicolored labels or like articles may be produced quickly and accurately. Another object is to provide a method for the production of such articles, either in their simplest form or in a plurality of colors. Other objects will be apparent from the following description of the invention.

In the accompanying drawings Fig. 1 is a diagrammatic representation, partly in section, of an improved apparatus adapted to the practice of this invention. Fig. 2 is a perspective view of the mold after passing through the machine shown in Fig. 1, parts of the mold being broken away. Fig. 3 illustrates the application of a backing sheet to the deposits in the mold. Fig. 4 shows the backing sheet with the deposits attached after removal from the mold. Fig. 5 shows a bicolored label or medallion produced by cutting up the sheet of Fig. 4. Fig. 6, Fig. 7, and Fig. 8 show the successive steps in the manufacture of another form of bicolored medallion which is illustrated in finished form in Fig. 9, employing a modified form of apparatus. Fig. 10 shows a group of the medallions of Fig. 9 transferred to a common backing.

The apparatus of Fig. 1 comprises essentially a table 10, suitably supported as by a framework 11, an extrusion device consisting of a body 12 with a long, narrow nozzle 13, and a plunger 14, mounted above the table 10 at such a distance that a mold 15 may be moved laterally between the nozzle 13 and the table 10, and means such as the fluid-operated plunger 16 for moving the mold 15. The plate or mold 15 contains a series of engraved cavities 17 in its upper surface. In the preferred form shown in the drawings a thin plate of metal 18 is separably mounted on the mold 15, being held in position by the pins 19, 19. The cavities 17 extend through the plate 18 into the mold 15.

In the operation of the apparatus, a plastic rubber mass 20 is placed in the throat of the extrusion device and forced downwardly by pressure put on the plunger 14, at the same time that the mold 15 is moved laterally under the nozzle 13 in the direction of the arrow by pressure applied to the plunger 16. The rubber mass 20 is squeezed into each successive cavity as it passes under the nozzle, producing the localized rubber deposits 21, the excess rubber being sheared off by the nozzle 13. A scraper or doctor blade 22, urged against the face of the mold 15 by a spring 23, may be provided to remove such of the rubber as may squeeze out between the nozzle 13 and the upper surface of the plate 18 on the mold 15.

It is found that even the scraper 22 is not always capable of removing all excess rubber from the upper surface of the mold 15, particularly if the mold is not absolutely true, or is somewhat worn or abraded. Any such rubber remaining on the mold would adhere to the backing sheet in the subsequent steps of this process, producing unsightly blemishes. This defect is overcome by providing the separate plate 18 to receive such excess rubber, the plate 18 being removed from the mold 15, without disturbing the deposits 21, before the backing sheet is applied. Fig. 2 shows the mold 15 with its cavities filled with rubber deposits 21, part of the plate 18 being broken away to show the relation of the deposits to the base portion of the mold 15.

After the plate 18 is removed, a sheet of flexible backing material 24, preferably unvulcanized rubber or rubberized fabric of a different color from that of the deposits 21, is placed on the face of the mold 15 and pressed into adhesive contact with the deposits, as indicated in Fig. 3, whereupon the backing material 24 may be stripped from the mold 15, carrying with it the deposits 21. The aspect of the product is illustrated in Fig. 4. If it is desired, the sheet may be employed as a whole for any purpose for which a sheet of material having projecting portions, particularly of a contrasting color, may be useful. On the other hand, if the purpose is to make rubber medallions or labels, the sheet may be cut up, say along the broken lines of Fig. 4, producing individual bicolored medallions such as that shown in Fig. 5.

According to another embodiment of my invention a mold 15, shown in Fig. 6, provided with a covering plate 18 has cavities 17 engraved therein. In the particular form shown, the cavities 17 are provided with a border 25 extending appreciably into the base portion of the mold 15, while the central portion of the cavities extends only through the covering plate 18. The edges of the portion of each cavity lying within the covering plate 18 are inclined upward toward the center, to facilitate removal of the plate 18 as well as for a further purpose which will be explained below. The mold and covering plate are passed under an extruding device such as than shown in Fig. 1, and the cavities 17 are thereby filled with deposits 21 of a colored rubber composition, whereupon the covering plate 18 is removed leaving the deposits in place on the base portion of the mold 15.

A second mold is provided, consisting of the two parts 26 and 27 shown upside down in Fig. 7. The part 26 (normally uppermost) represents a covering plate separably mounted on the base part 27. Cavities 28 are engraved through the thickness of the covering plate 26, but are not permitted to penetrate the base 27. On the contrary, the base 27 is provided with projections 29 extending into the cavities, and corresponding exactly in size, shape and location with the portions of the cavities 17 within the covering plate 18; that is, with the portion of the deposits 21 projecting above the base portion of the mold 15 after the removal of the covering plate 18. The second mold with the covering plate 26 in place on top of the base 27 is passed beneath an extrusion apparatus such as that shown in Fig. 1, whereby the cavities 28 are filled with deposits 30 of a rubber composition of a color contrasting with that of the deposits 21. A smooth plate 31 is superimposed on the mold and the deposits therein, and the assembly is turned upside down to bring the parts into the position shown in Fig. 7, whereupon the base 27 is removed.

After the base 27 is removed from the second mold it exposes the lower surface of the covering sheet 26 and the deposits 30 therein, as well as the series of depressions in the deposits corresponding to the projecting portions of the deposits 21. The base portion of the mold 15 with the deposits 21 thereon is then turned upside down and placed on the sheet 26 with the projecting portions of the deposits 17 fitting in the depressions in the deposits 30 as shown in Fig. 8. The inclination of the sides of the deposits 17 facilitate the accurate juxtaposition of the plates and their respective rubber deposits and obviates an accidental distortion of the rubber caused by the edges of the deposits catching or interfering with one another.

The finished medallion or label may be vulcanized either partially or completely within the mold constituted by the three plates 15, 26, and 31 in Fig. 8, or it may be removed therefrom in an unvulcanized condition by separating the three plates. It is evident that the finished medallion shown in Fig. 9 corresponds essentially to that of Fig. 5, except that the preformed deposit 30 is substituted for the portion of the backing sheet 24, and that the surfaces of the two deposits 17 and 30 are brought to the same level by an ingenious design of the molds. The fully molded article of Fig. 9 is produced by substituting a few simple manipulations for the laborious and rather inaccurate process of cutting up the sheet of medallions shown in Fig. 4.

Although the invention has been described above with reference to a very simple embodiment of the invention; namely, a plain diamond-shaped medallion, it is obviously not limited thereto. The deposits may be formed in practically any shape, simple or intricate, and may be produced with smooth surfaces or with lettering or other designs impressed thereon, simply by engraving the molds with the converse of the designs which are wanted. Such modifications will be obvious to those skilled in the art of designing or making molds.

If desired, the combined deposits 17 and 30, instead of being removed as a finished medallion, may be affixed to a backing sheet 32 to produce the product shown in Fig. 10 by removing the plain plate 31 and pressing a suitable sheet, say of unvulcanized rubber of a third color contrasting with each of the deposits 17 and 30, against the rubber deposits thus exposed. The backing may then be removed from the molds together with the deposits, the whole constituting a series of three-colored medallions, or a like decorative rubber article. By further modifications and repeated application of the process and principles of this invention many different colored deposits may be combined in almost any desired pattern.

The medallions or other articles produced by the practice of this invention may be useful as such, either in the unvulcanized state or after vulcanization, or they may be affixed, preferably before vulcanization, to rubber articles such as boots and shoes, tires, water bottles, etc., and vulcanized therewith. In this manner such articles are readily provided with multicolored medallions, manufacturer's labels, or other decorative devices.

It is apparent that this invention is susceptible of numerous modifications, and that many changes may be made in the process and product hereinbefore described without exceeding the spirit and scope of this invention. It is to be understood, therefore, that the invention is not to be limited except as may be required by the prior art and as indicated in the appended claims.

I claim:

1. The method of making a composite structure which comprises producing a localized deposit of rubber in the cavities of an open-cavity engraved mold consisting of a base plate and an upper covering plate, the cavities of which extend entirely through the upper covering plate, removing the covering plate together with any excess rubber, and superimposing on the deposit a mass of rubber greater in extent than the deposit.

2. The method of making a composite structure which comprises filling with a plastic rubber composition the cavities of an open-cavity engraved mold consisting of a base plate and an upper covering plate, the cavities of which extend entirely through the upper covering plate, removing the covering plate together with any excess rubber, superimposing on the deposit a mass of rubber greater in extent than the deposit, and removing the composite structure from the mold.

3. The method of making a composite structure which comprises progressively filling with a plastic rubber composition of one color the cavities of an open-cavity engraved mold consisting of a base plate and an upper covering plate, the cavities of which extend entirely through the upper covering plate, removing the covering plate together with any excess rubber, superimposing on the deposit a mass of rubber of another color greater in extent than the deposit, and stripping the composite structure from the mold.

4. The method of making a composite structure which comprises progressively filling with a plastic unvulcanized rubber composition of one color a plurality of cavities in an open-cavity engraved mold consisting of a base plate and an upper covering plate, the cavities of which extend entirely through the upper covering plate, removing the covering plate together with any excess rubber, superimposing on the deposits a continuous sheet of unvulcanized rubber of another color, stripping the sheet and the deposits from the mold, cutting up the sheet into individual medallions, and vulcanizing the rubber.

5. The method of making a composite structure which comprises producing a localized deposit of rubber on a supporting surface, separately producing a second localized deposit of rubber of greater extent on another supporting surface, and juxtaposing the two supporting surfaces, whereby the respective deposits are brought in adhesive contact one with another with the margin of one deposit extending beyond that of the other.

6. The method of making a composite structure which comprises producing a localized deposit of a rubber composition in a predetermined configuration on a supporting surface, separately producing a second localized deposit of a different rubber composition in a corresponding configuration but of greater extent on another supporting surface, juxtaposing the two supporting surfaces to bring the respective deposits into adhesive contact one with another with the margin of one deposit extending beyond that of the other, and removing the united deposits from their supports.

7. The method of making a composite structure which comprises producing a localized deposit of colored rubber in a predetermined configuration on a supoprting surface, separately producing a second localized deposit of rubber of another color on a second supporting surface in such a configuration that it will not completely mask the first-mentioned deposit when superposed thereon, juxtaposing the two supporting surfaces to bring the respective deposits into adhesive contact with one another, and removing the united deposits from their supports.

8. A method as in claim 7, in which the united rubber deposits are subsequently vulcanized.

9. A method as in claim 7, in which the united rubber deposits are affixed to an unvulcanized rubber article and vulcanized therewith.

10. A method of making a composite structure which comprises progressively filling with a plastic rubber composition of one color the cavities of an open-cavity engraved mold consisting of a base-plate and an upper covering plate, the cavities of which extend entirely through the upper covering plate, removing the covering plate together with any excess rubber, progressively filling with a plastic rubber composition of another color the cavities of a second two-part open-cavity mold, the cavities of which likewise extend entirely through the upper covering plate of the mold and are so shaped as to inclose rubber deposits greater in extent than the deposits formed in the first-mentioned mold and adapted to cooperate with them in the formation of a bicolored decorative rubber article, removing the covering plate from the second mold together with any excess rubber, juxtaposing the two molds to bring the respective series of deposits in adhesive contact in the predetermined mutual cooperative relationship with one another, and vulcanizing the rubber.

11. A method as in claim 10, in which the united rubber deposits are affixed to rubber surfaces before vulcanization.

CHARLES W. LEGUILLON.